No. 715,819. Patented Dec. 16, 1902.
H. W. LAPSLEY.
BICYCLE BRAKE.
(Application filed Oct. 9, 1902.)
(No Model.) 2 Sheets—Sheet 1.

Witnesses
J. P. Brett
Harry Ellis Chandler

Inventor
H. W. Lapsley
By Chandler & Chandler
Attorneys

No. 715,819. Patented Dec. 16, 1902.
H. W. LAPSLEY.
BICYCLE BRAKE.
(Application filed Oct. 9, 1902.)

(No Model.) 2 Sheets—Sheet 2.

Witnesses
T. P. Brett
Harry Ellis Chandler

Inventor
H. W. Lapsley,
By Chandler & Chandler
Attorneys

UNITED STATES PATENT OFFICE.

HARRY W. LAPSLEY, OF BURLINGTON JUNCTION, MISSOURI.

BICYCLE-BRAKE.

SPECIFICATION forming part of Letters Patent No. 715,819, dated December 16, 1902.

Application filed October 9, 1902. Serial No. 126,439. (No model.)

*To all whom it may concern:*

Be it known that I, HARRY W. LAPSLEY, a citizen of the United States, residing at Burlington Junction, in the county of Nodaway, State of Missouri, have invented certain new and useful Improvements in Bicycle-Brakes; and I do hereby declare the following to be a full, clear, and exact description of the invention, such as will enable others skilled in the art to which it appertains to make and use the same.

This invention relates to bicycle-brakes; and it has for its object to provide a construction which will be cheap and simple of construction and which may be operated by the feet of the rider to exert great pressure.

A further object of the invention is to provide a construction which may be applied to the common form of bicycle without modification of the parts thereof.

Other objects and advantages of the invention will be understood from the following description.

Figure 1:
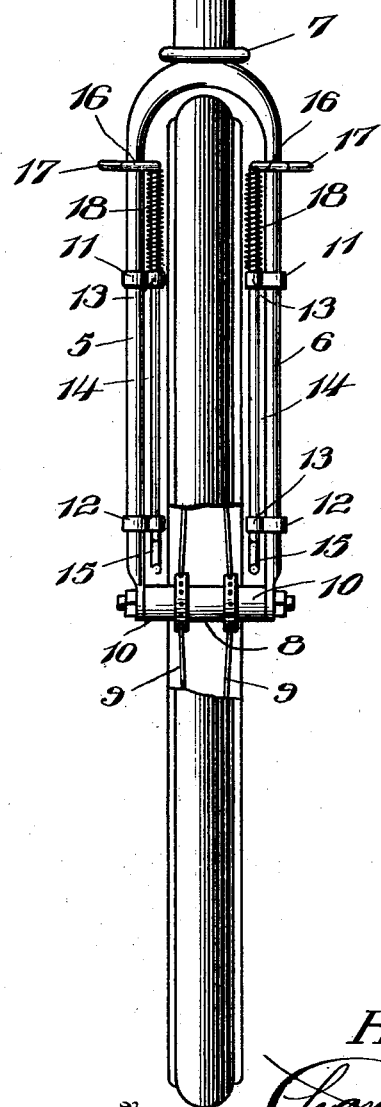
Figure 3:
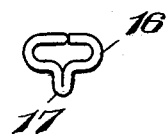
Figure 3:
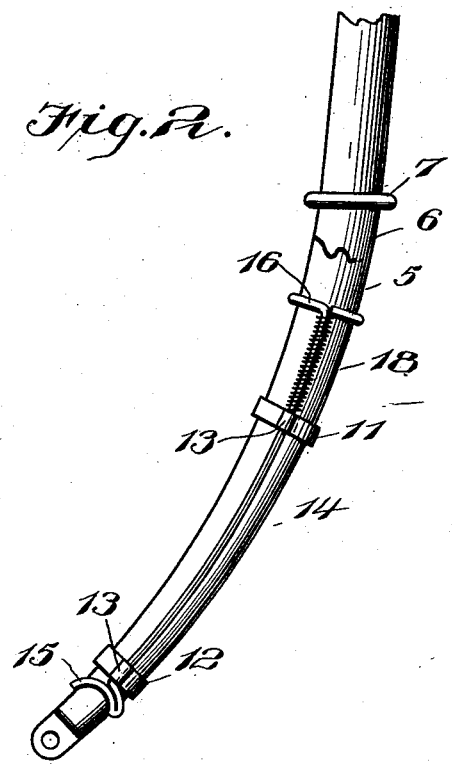
Figure 4:
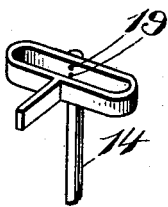

In the drawings forming a portion of this specification, and in which like numerals of reference indicate similar parts in the several views, Figure 1 is a front elevation of a bicycle, showing the present brake mechanism applied thereto, a portion of the front wheel being broken away. Fig. 2 is an elevation showing the inner face of one of the front-fork sides with the brake-rod attached thereto. Fig. 3 is a top end view of one of the brake-rods. Fig. 4 is a perspective view of a second form of brake-rod.

Referring now to the drawings, there is shown a bicycle comprising the front fork, including the sides 5 and 6, connected to the fork-crown 7 in the usual manner, and at the lower ends of which is an axle on which is rotatably mounted a wheel including a hub 8, to which are connected the spokes 9, the ends of the hub projecting slightly beyond the inner ends of the spokes to form brake-drums 10 at the ends of the hub and against which act the brake-shoes, hereinafter described.

Upon each of the fork sides of the bicycle are secured clips 11 and 12, respectively, having inwardly-projecting ears 13, having alining perforations in which is received the brake-rod 14, the brake-rods and equipments of the two fork sides being the same, so that a description of one will suffice for both.

Each of the brake-rods is bent rearwardly at its lower end, after which it is bent downwardly upon itself and forwardly to form the curved substantially horizontal brake-shoe 15, which is adapted for engagement with the corresponding brake-drum of the front-wheel hub. The brake-rod is of spring material, so that the loop at the rear end of the brake-shoe will give slightly, and hence when the brake is applied to its drum the action of the brake is gradual instead of the sudden stopping which would be occasioned if the shoe were unyielding.

The upper end of the brake-rod is bent laterally to form a loop 16, which is disposed to encircle the fork side, beyond which the loop is contracted to form the pedal 17 to receive the foot of the rider for applying the brake, the loop being slidable upon the fork side, so that the rod may move longitudinally with ease.

To hold the brake-shoe normally and yieldably out of engaging position and to return it when released after being depressed, a helical spring 18 is disposed upon the brake-rod and rests with its upper end against the loop 16 and its lower end against the upper clip 11.

Instead of forming the loop 16 integral with the brake-rod said loop may be separate therefrom, as shown in Fig. 4 of the drawings, and connected thereto removably by means of screws 19 or in any other suitable manner. With this construction it will be seen that when the brakes are to be applied the operator may press with his feet upon the pedals or foot-pieces 17 and by forcing them downwardly apply the brake-shoes to the brake-drums at the ends of the hub.

In practice other modifications may be made and any suitable materials and proportions may be used for the various parts without departing from the spirit of the invention.

What is claimed is—

1. The combination with a bicycle having a front wheel including a hub having terminal brake-drums, of clips engaged with the front-fork sides, brake-rods slidably engaged with the clips and having yieldable brake-shoes at their lower ends, and loops at the upper ends of the rods encircling the fork sides, said loops having outwardly-directed foot-pieces.

2. The combination with a bicycle having a front wheel including a hub having terminal brake-drums, of clips engaged with the fork sides, brake-rods slidably engaged with the clips and having yieldable brake-shoes at their lower ends, loops at the upper ends of the brake-rods encircling the fork sides and slidable thereon, said loops having laterally-extending foot-pieces, and helical springs disposed upon the rods with their ends against the loops and the adjacent clips, respectively.

In testimony whereof I affix my signature in presence of two witnesses.

HARRY W. LAPSLEY.

Witnesses:
T. E. FORDYCE,
R. D. CARKEN.